United States Patent
Thomas et al.

(10) Patent No.: US 7,756,053 B2
(45) Date of Patent: Jul. 13, 2010

(54) MEMORY AGENT WITH ERROR HARDWARE

(75) Inventors: Tessil Thomas, Benson Town (IN); Henk Neefs, Palo Alto, CA (US); Ramesh S, Bangalore (IN)

(73) Assignee: Intel Corporation, Santa Clara, CA (US)

(*) Notice: Subject to any disclaimer, the term of this patent is extended or adjusted under 35 U.S.C. 154(b) by 1048 days.

(21) Appl. No.: 11/427,955

(22) Filed: Jun. 30, 2006

(65) Prior Publication Data

US 2008/0002590 A1    Jan. 3, 2008

(51) Int. Cl.
*H04J 1/16*   (2006.01)
*H04L 12/56*  (2006.01)

(52) U.S. Cl. .................. 370/252; 370/216; 370/241; 370/419

(58) Field of Classification Search ......... 370/216–228, 370/241–253, 419
See application file for complete search history.

(56) References Cited

U.S. PATENT DOCUMENTS

| | | | |
|---|---|---|---|
| 6,775,799 B1* | 8/2004 | Giorgetta et al. ............ 714/751 |
| 6,963,970 B2 | 11/2005 | Culter et al. | |
| 7,187,307 B1* | 3/2007 | Schmidt et al. ............... 341/50 |
| 7,320,084 B2* | 1/2008 | Steinmetz et al. ............. 714/4 |
| 7,610,544 B2* | 10/2009 | Guo ........................... 714/776 |
| 2004/0088636 A1* | 5/2004 | Cypher ....................... 714/764 |
| 2004/0177242 A1* | 9/2004 | Erickson et al. ............... 713/2 |
| 2004/0246767 A1* | 12/2004 | Vogt ........................... 365/154 |
| 2007/0101094 A1* | 5/2007 | Thayer et al. ................ 711/202 |
| 2007/0255902 A1* | 11/2007 | Gower et al. ................. 711/115 |
| 2008/0215929 A1* | 9/2008 | Cordero et al. ................ 714/52 |

* cited by examiner

*Primary Examiner*—John Pezzlo
(74) *Attorney, Agent, or Firm*—Marger Johnson & McCollom, PC

(57) ABSTRACT

A memory agent that communicates with another memory agent over links may include error hardware to monitor errors in the links. In some embodiments, the error hardware may include logic to classify the errors into different severity levels, control corrective action based on the severity level of errors, and/or perform various levels of reset based on the severity level of errors. Other embodiments are disclosed and claimed.

9 Claims, 9 Drawing Sheets

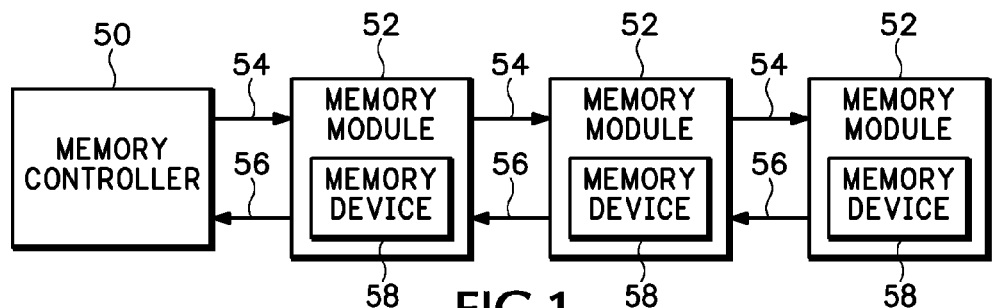
FIG.1
PRIOR ART
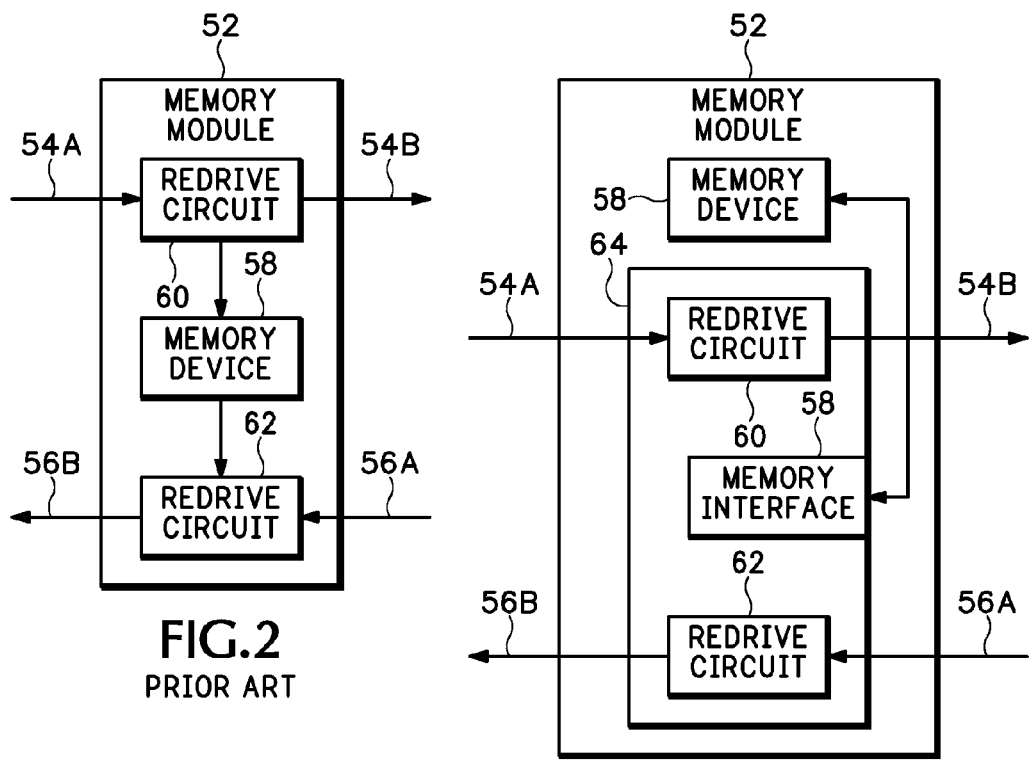
FIG.2
PRIOR ART
FIG.3
PRIOR ART

MEMORY AGENT WITH ERROR HARDWARE

BACKGROUND

FIG. 1 illustrates a prior art memory system that includes a memory controller 50 and one or more memory modules 52 that communicate through a channel made up of unidirectional links. The channel has an outbound path that includes one or more outbound links 54, and an inbound path that includes one or more inbound links 56. Each module may be capable of redriving signals from link to link on the outbound path and from link to link on the inbound path. Each module may also be capable of selectively disabling any redrive features, for example, if the module detects that it is the outermost module, or responsive to a command from the memory controller.

Each module includes one or more memory devices 58 arranged to transfer data to and/or from one or more of the paths. For example, the module may be arranged such that data from the outbound path is transferred to a memory device, and data from the memory device is transferred to the inbound path. One or more buffers may be disposed between one or more memory devices and one or more of the paths. The memory devices may be read only memory (ROM), dynamic random access memory (DRAM), flash memory, etc.

FIG. 2 illustrates a prior art memory module 52 that includes two redrive circuits 60 and 62 to receive signals on unidirectional links 54A and 56A, and redrive the signals on unidirectional links 54B and 56B, respectively. One or more memory devices 58 are arranged to transfer data to and/or from one or more of the redrive circuits.

If the module of FIG. 2 is used in a memory system such as that shown in FIG. 1, then redrive circuit 60 might be designated as an outbound redrive circuit and arranged to receive and redrive signals on an outbound path including links 54A and 54B, and the other redrive circuit 62 might be designated as an inbound redrive circuit and arranged to receive and redrive signals on an inbound path including links 56A and 56B. One or more memory devices 58 may be arranged so that data is transferred from the outbound redrive circuit 60 to the memory device(s) and from the memory device(s) to the inbound redrive circuit 62.

FIG. 3 illustrates a prior art memory module. The module of FIG. 3 includes a memory buffer 64 having two redrive circuits 60 and 62 to receive signals on unidirectional links 54A and 56A, and redrive the signals on unidirectional links 54B and 56B, respectively. The memory buffer also includes a memory interface 66 arranged to transfer data to and from one or more memory devices 58.

If the module of FIG. 3 is used in a memory system such as that shown in FIG. 1, then redrive circuit 60 might be designated as an outbound redrive circuit and arranged to receive and redrive signals on an outbound path including links 54A and 54B, and the other redrive circuit 62 might be designated as an inbound redrive circuit and arranged to receive and redrive signals on an inbound path including links 56A and 56B.

FIG. 4 illustrates a prior art memory system with memory modules and memory buffers. Referring to FIG. 4, one or more memory modules 52 are based on printed circuit boards having contact fingers along both sides of one edge to create a dual inline memory module (DIMM) that may be plugged into a connector on another circuit board that holds other components of the system. An existing form-factor may be adopted for the module, for example the DIMM form-factor used for Double Data Rate II (DDR2) dynamic random access memory (DRAM) modules.

The modules are populated with memory devices 58, for example, commodity-type DRAM such as DDR2 DRAM. A memory buffer 64 on each module isolates the memory devices from a channel that interfaces the modules to the memory controller 50, which is also referred to as a host. The channel is wired in a point-to-point arrangement with an outbound path that includes outbound links 54, and an inbound path that includes inbound links 56. The links may be implemented with parallel unidirectional bit lanes using low-voltage differential signals.

In the embodiments of FIG. 4, no additional signal lines are used for functions such as command, reset, initialization, and the like. Instead, these functions are encoded directly in the data sent over the channel.

A reference clock signal REF CLK is generated by a clock synthesizer 76 distributed to the host and modules, maybe through a clock buffer 78. Because a common reference clock is available at each agent, data signals may be clocked without any frequency tracking. The host may initiate data transfers by sending data, maybe in packets or frames, to the innermost module on the outbound path. The innermost module receives and redrives the data to the next module on the outbound path. Each module receives and redrives the outbound data until it reaches the outermost module. Although the outermost module could attempt to redrive the data to a "nonexistent" outbound link, each module may be capable of detecting (or being instructed) that it is the outermost module and disabling any redrive circuitry to reduce unnecessary power consumption, noise, etc. In this embodiment, data transfers in the direction of the host, i.e., inbound, are initiated by the outermost module. Each module receives and redrives inbound data along the inbound path until it reaches the host.

BRIEF DESCRIPTION OF THE DRAWINGS

FIG. 1 illustrates a prior art memory interface system.

FIG. 2 illustrates a prior art memory module.

FIG. 3 illustrates another prior art memory module.

DETAILED DESCRIPTION

Figure 4:
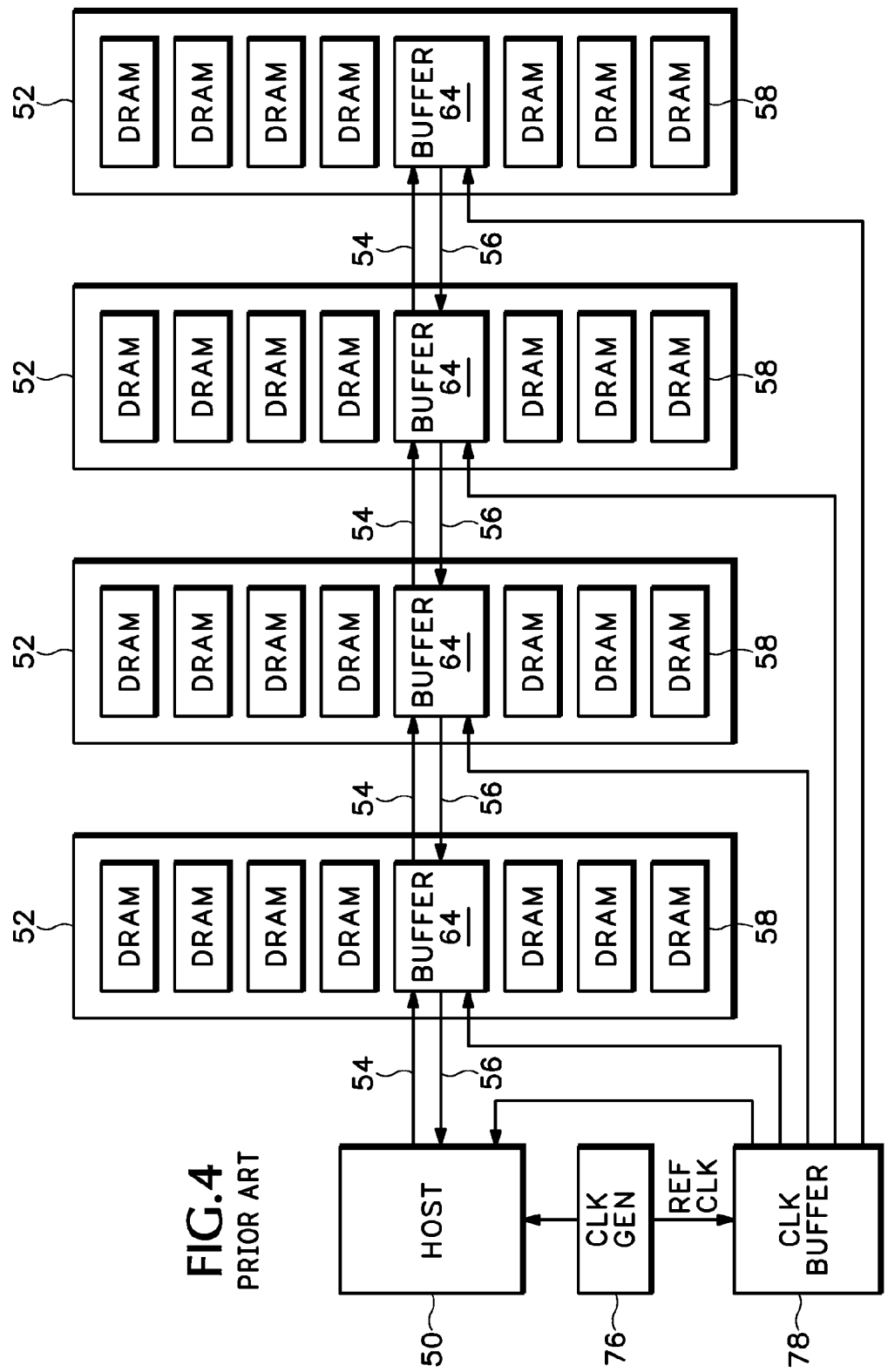
FIG. 4 illustrates another prior art memory system.
Figure 5:
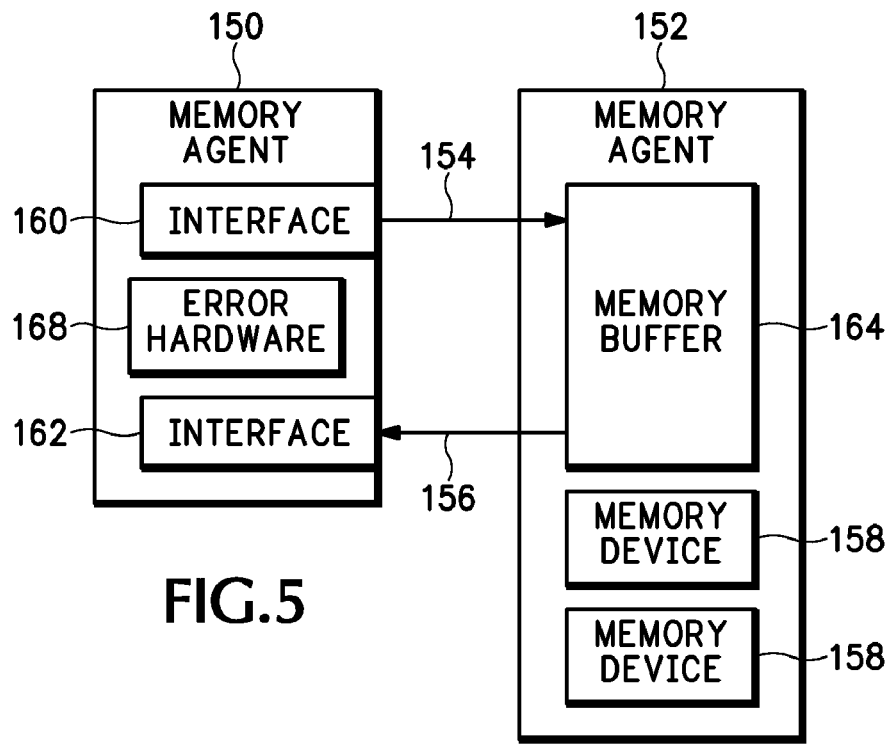
FIG. 5 illustrates a memory system according to some of some of the inventive principles of this patent disclosure.

FIG. 5 illustrates a memory system according to some of the inventive principles of this patent disclosure. The system of FIG. 5 includes a first memory agent 150 that communicates with a second memory agent 152. The first memory agent includes a first interface 160 and a second interface 162. The second memory agent 152 includes a memory buffer 164 and one or more memory devices 158. The memory agents 150 and 152 communicate through a channel made up of point-to-point links which, in this example, are unidirectional links. The channel has an outbound path that includes one or more outbound links 154 coupled between the first interface 160 and the second memory agent to transmit data from the first to the second memory agent. The channel also includes an inbound path that includes one or more inbound links 156 to transmit signals from the second memory agent to the second interface 162 of the first memory agent.

The first memory agent 150 includes error hardware 168 to perform one or more functions related to errors in the links. For example, the hardware may include logic to monitor errors in the links, classify the errors into different severity levels, control corrective action based on the severity level of errors, and/or perform various levels of reset based on the severity level of errors. In some embodiments, the hardware 168 may include support logic to monitor the types and/or frequency of errors. In some embodiments, the hardware may include logic to perform error rectification processes without firmware involvement. However, if the error is too severe, the hardware may involve external firmware to partially or fully control the error rectification process. The various logic may be centralized or distributed throughout the memory agent.

Figure 6:
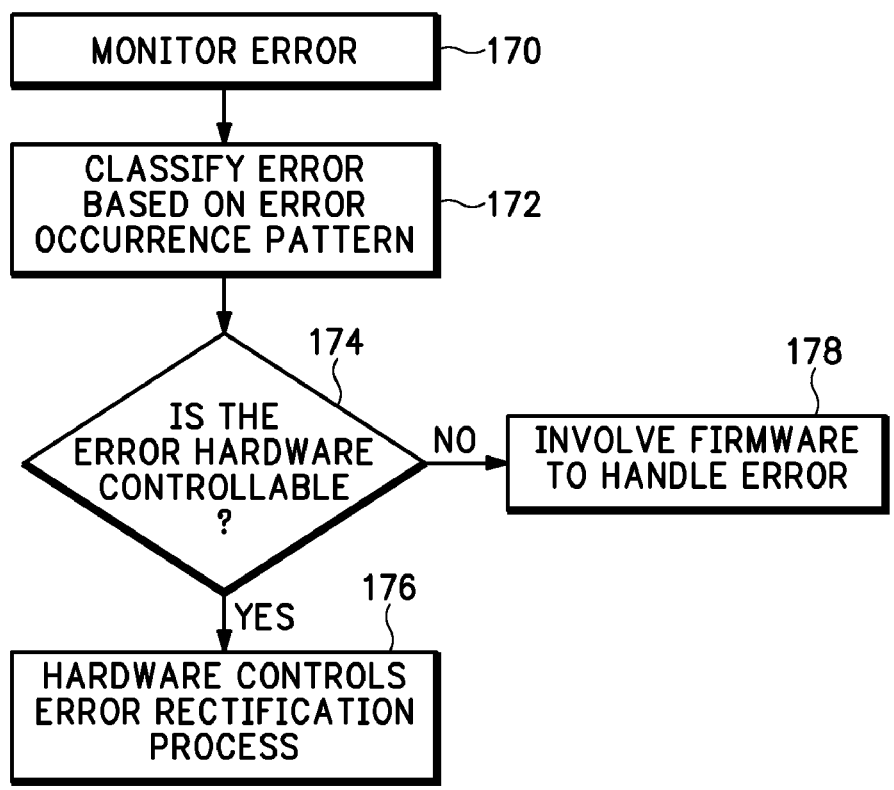
FIG. 6 illustrates an embodiment of a link error handling operation according to some of some of the inventive principles of this patent disclosure.

FIG. 6 illustrates an embodiment of a link error handling operation for the system of FIG. 5 in accordance with some of the inventive principles of this patent disclosure. At (170), any error occurrence in the inbound and the outbound links are monitored by the hardware 168. The hardware classifies the error (172) based on the error occurrence pattern. Several factors may be used to classify the error, for example, the type of error, the frequency of error, etc. Based on this classification, at (174) the hardware decides whether it can control an error rectification process. If the error is of low or medium severity (176), the hardware itself controls the error rectification operation. The steps involved in the error rectification operation may include, for example, draining all pending memory commands, soft reset of the channel, etc. On the other hand, if the error severity level is high and the hardware itself cannot control the error, it may request that firmware take partial or full control of the error rectification operation (178).

Figure 7:
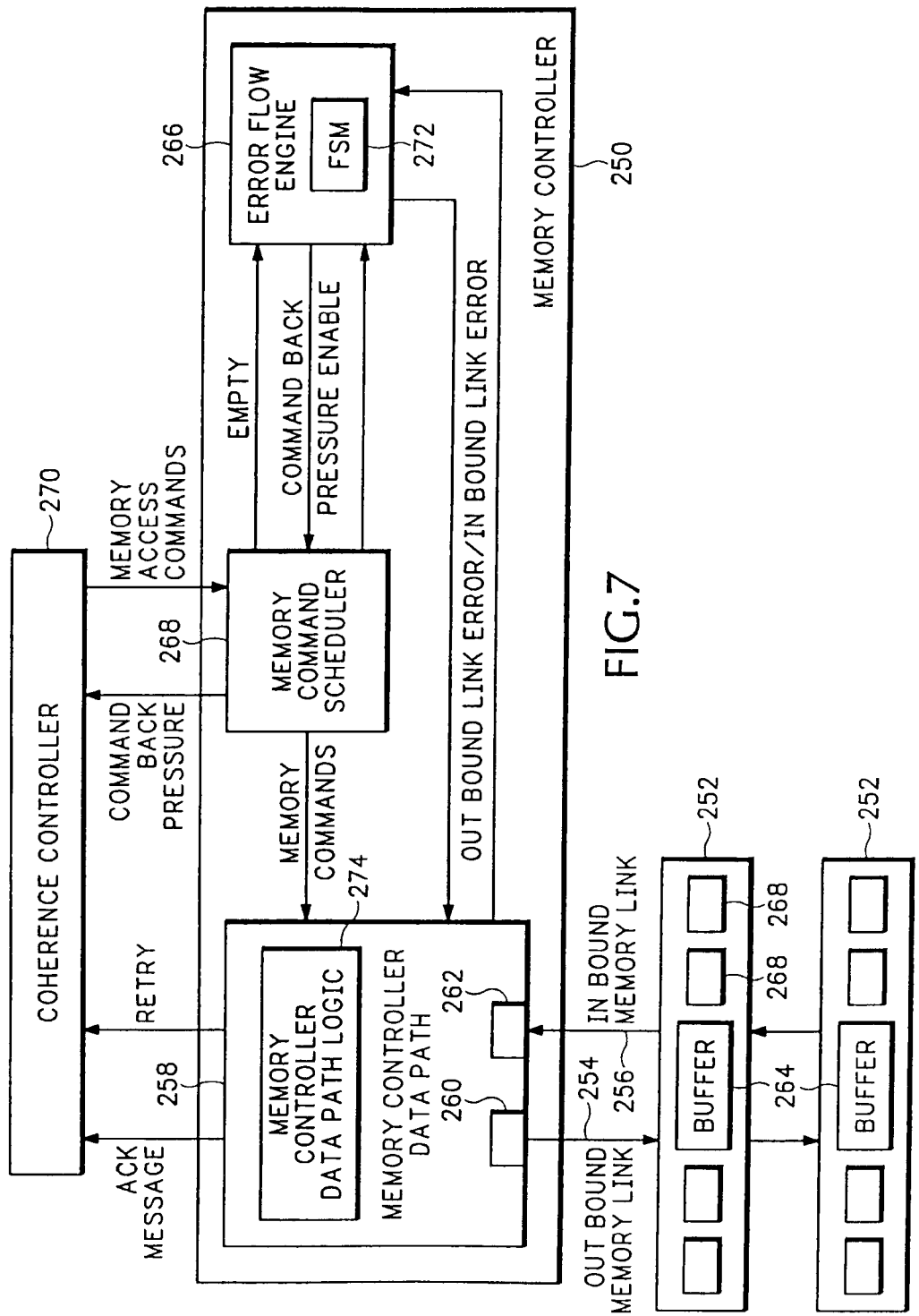
FIG. 7 illustrates another embodiment of a memory system according to some of some of the inventive principles of this patent disclosure.

FIG. 7 illustrates a more detailed embodiment of a memory system according to some of the inventive principles of this patent disclosure. The system of FIG. 7 includes a memory controller 250 and one or more memory modules 252. The memory modules 252 are populated with memory devices 268, which may be, for example, commodity-type DRAM such as double data rate II (DDR2) DRAM. A memory buffer 264 on each module isolates the memory devices from a channel that interfaces the modules to the memory controller 250, which is also referred to as a host. The channel is wired in a point-to-point arrangement with an outbound path that includes outbound links 254, and an inbound path that includes inbound links 256. The links may be implemented with parallel unidirectional bit lanes. The memory controller includes a memory controller data path 258, which may further include a first and a second interface 260 and 262 respectively and memory controller data path logic 274. The outbound and the inbound links may be coupled to the first and the second interface respectively. The memory controller data path logic 274 may perform various support tasks. For example, it may detect any error in the inbound or the outbound link and report the same to other memory controller components.

The memory controller 250 may also include various support logic distributed across different parts of the memory controller. Alternatively, the support logic may be part of an error flow engine 266. In yet another alternative arrangement, some of these support logic may be distributed in various parts of the memory controller and rest of the support logic may be an integral part of the error flow engine 266. An example of support logic is the memory controller data path logic 274. The support logic may perform various tasks independently or under the supervision of the error flow engine. Alternatively, some of the support logic may be controlled by the error flow engine and the rest by some other component of the memory controller or by external firmware. Examples of tasks that may be performed by the support logic include detecting and logging errors and error rates, reporting these errors to the error flow engine, draining pending commands during an error flow, raising interrupt commands in un-recoverable situations, injecting soft and fast reset commands, etc.

The memory controller also includes a memory command scheduler 268 which receives memory access commands from a coherence controller 270. The coherence controller 270 may be a used to maintain coherency of data transmitted between the memory controller and other devices and acts as a master to the memory controller. The memory command scheduler may schedule commands for one of the memory devices 268 in one of the memory modules 252 and transmit them out on the outbound link towards the memory modules through the memory controller data path.

For a successfully executed command, the memory controller 250 may send an acknowledge response ACK to the coherence controller. If the memory controller 250 cannot handle a command properly, it may send a RETRY response to the coherence controller 270, after which the coherence controller may resend the same command to memory command scheduler 268. If the memory controller 250 does not want to or can not receive any memory commands from the coherence controller, the memory command scheduler may assert a back pressure command to the coherence controller 270. This prevents the coherence controller from transmitting any further memory access commands to the memory controller. Back pressure may be asserted, for example, during an error rectification process.

The memory controller 250 also includes an error flow engine 266. The error flow engine may handle errors associated with the memory system, for example, errors in the links, control/buffer structure parity errors that may occur in the memory controller, etc. The error flow engine may receive error monitoring information from the memory controller data path logic 274. Based on this, the error flow engine may categorize errors into different severity levels and control appropriate corrective action based on the severity level. The classification of errors and associated corrective action by the error flow engine will be referred to as "error flow". The error flow engine 266 may include a master control Finite State Machine (FSM) 272.

In some memory systems, each frame may be sent along with a cyclical redundancy check (CRC) code that is used to check the integrity of the data in the frame. The memory modules 252 may also be capable of using a CRC in inbound link signals to check data integrity. Additionally, a memory module may intentionally send the wrong CRC code with a frame that contains an idle pattern. Such a technique may be useful as an alternative or supplemental way to distinguish a data pattern from an idle pattern. The receiving module may then interpret the frame as an idle frame rather than a data frame. Some memory systems may utilize a path or paths having an extra bit lane to carry CRC data. As used herein, the term CRC refers not only to a cyclical redundancy check, but also to any other type of error checking scheme used to verify the integrity of a frame or pattern.

In memory systems where memory read and write data is transferred between memory modules, it may also be useful to send other information such as idle patterns, alert patterns, and module status information between memory modules and the memory controller. This may be accomplished by sending data patterns and other information patterns on the same link or links that connect the memory modules and the controller, in a time multiplexed fashion and according to the controller's requests.

For example, if such a technique is used with the embodiment of FIG. 7, the memory controller 250 may send frames having data patterns such as read commands to one or more of the modules 252 which respond by sending frames having data patterns such as read data back to the controller. It may be useful for one or more of the modules to send a frame having an idle pattern back to the memory controller, for example, if there was no read command from the memory command scheduler, i.e., if the memory module had nothing to transmit. A predetermined data pattern may be designated as an idle pattern so that, if the memory controller receives the idle pattern, it knows it is not receiving read data. This may cause problems, however, if the actual read data pattern happens to match the designated idle pattern.

Figure 8:
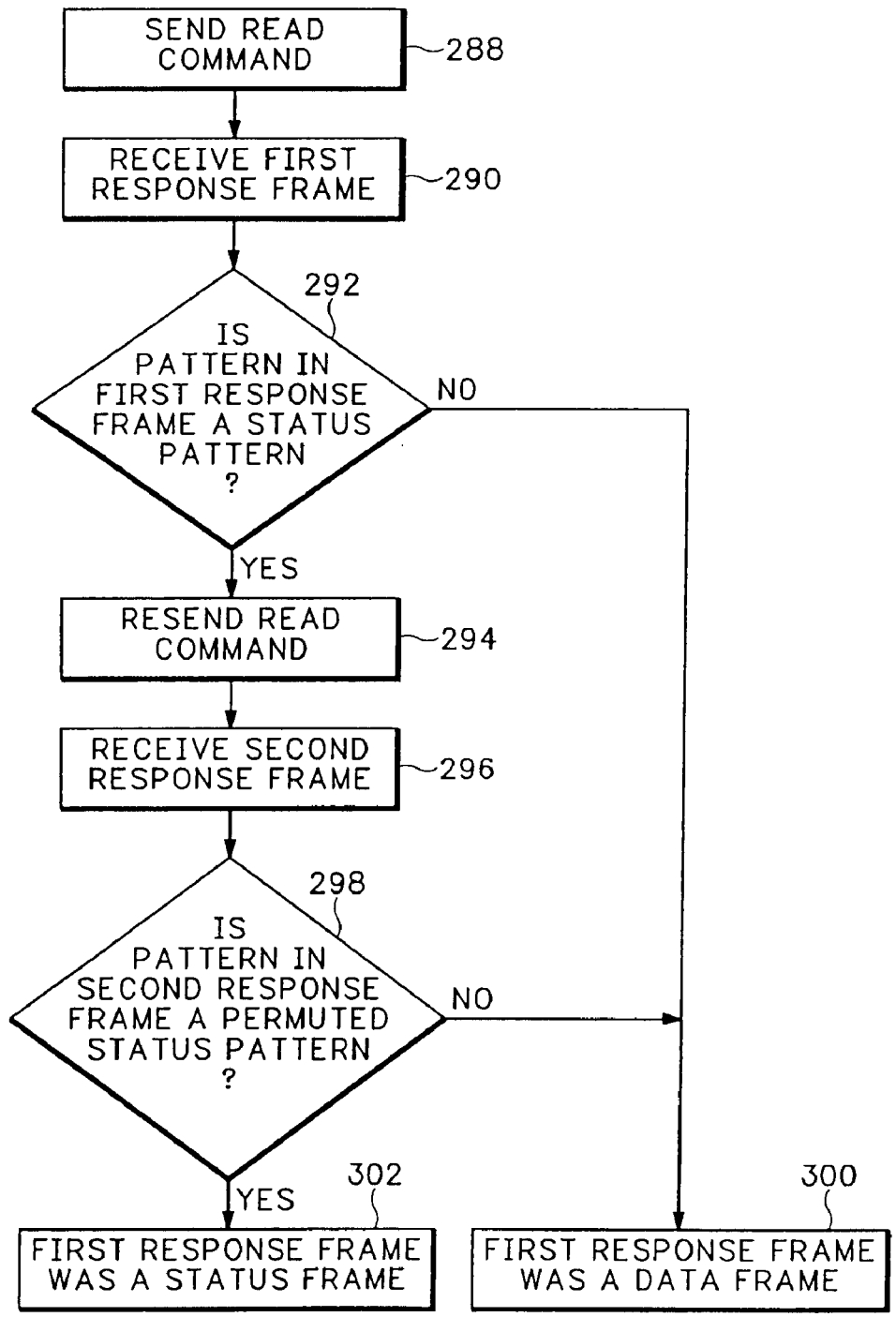
FIG. 8 illustrates an embodiment of a method for permuting status patterns.

To cope with this problem, the memory controller and one or more modules may both be capable of permuting the idle pattern in a predictable manner so that the idle pattern changes over time. For example, the memory controller and modules may change the idle pattern according to a predetermined sequence each time an idle frame is sent and/or received. An embodiment of such a method is illustrated in FIG. 8. Thus, if the memory controller sends a read command frame (288) and receives a response frame (290) having the current idle pattern (292), it may resend the same read command (294). If the second response frame (296) contains the same pattern as the first (298), it interprets the pattern as actual read data (3000). If, however, the pattern in the second response frame matches the permuted idle pattern (298), the memory controller knows that the first response frame was an idle frame (302). Alternatively, the idle frame may contain a CRC error and hence, an idle frame and a data frame may also be differentiated using a CRC check.

In alternate embodiments, the memory system of FIG. 7 may operate without any CRC lane. In that case, other error detecting techniques may be used to detect errors in the inbound links. For example, an appropriate error correction code (ECC) engine may be used in the memory controller.

Inbound/Outbound Error Detection

Figure 9:
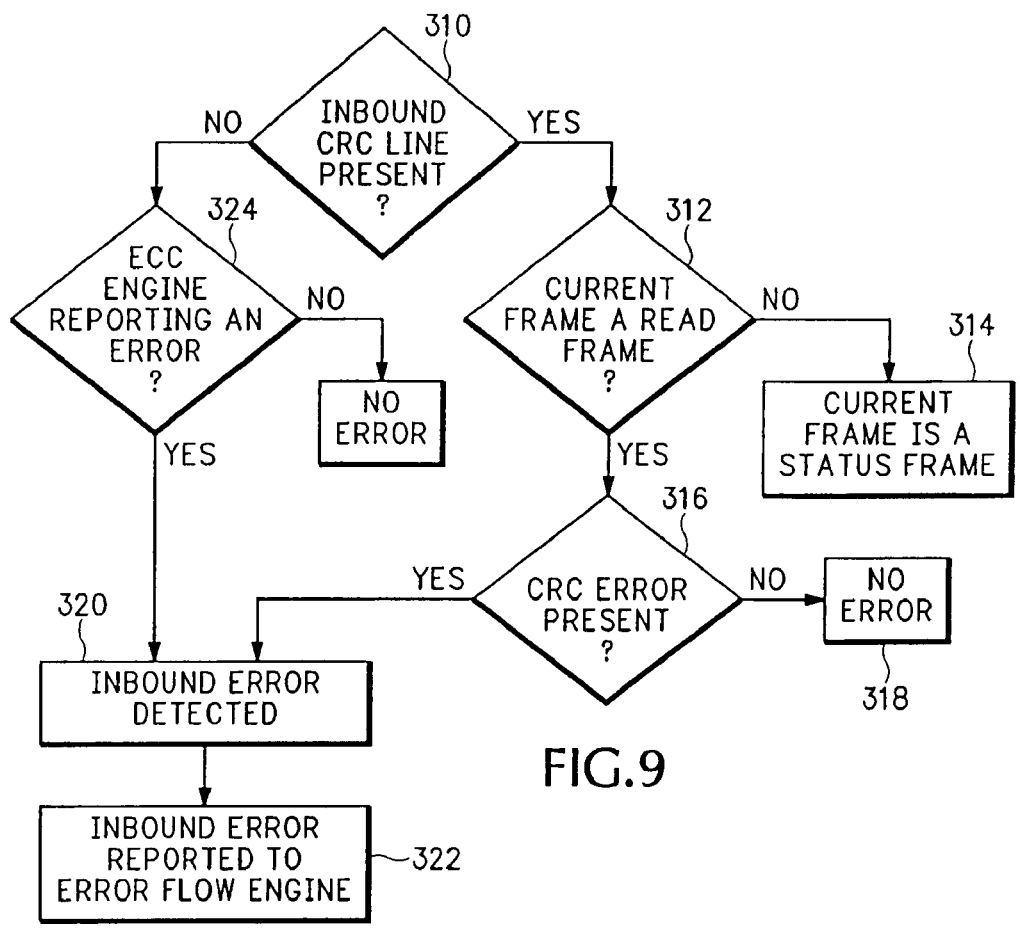
FIG. 9 illustrates an embodiment of an inbound link error detection and reporting algorithm according to some of the inventive principles of this patent disclosure.

FIG. 9 illustrates an embodiment of an exemplary inbound link error detection and reporting algorithm according to some of the inventive principles of this patent disclosure. Support logic (for example, the memory controller data path logic 274 of FIG. 7) in the memory controller 250 may check for the presence of a CRC lane (310) in the inbound link. If a CRC lane is present, the current frame is a read frame (312), and a CRC error is present in the read frame (316), then the logic detects an error in the inbound link (320) and reports it to the error flow engine (322). Alternatively, in the absence of a CRC lane (310), an appropriate ECC engine may check for any possible error (324) in the inbound link, and if an error is present (320), may report it to the error flow engine (322).

The status information sent in a status frame by any one of the memory modules 252 to the memory controller 250 in the inbound link may include status information such as command error information from the memory controller to a memory module, error information in the outbound link signal, etc. Upon occurrence of an outbound link error (for example, upon receiving an erroneous command or write data from the controller), the memory module will immediately start sending special alert frames which have the binary inverse of the currently expected idle frame pattern on the inbound link. An outbound link error is detected and reported to the error flow engine whenever an alert frame is present in the inbound traffic. Outbound error detection and reporting to the error flow engine may be handled by appropriate support logic (for example, memory controller data path logic 274).

Error Classification

Depending on the error occurrence pattern, an error condition of the link may be classified into different severity levels. Once an appropriate error severity level is determined, appropriate corrective error flow/actions may be invoked. In one embodiment, the errors may be classified into three categories: transient, persistent and uncontrollable. However, the inventive principles of this patent disclosure are not limited to any particular error classification. Alternative error categories can also be used, for example, errors may be classified in two categories: hardware controllable and hardware uncontrollable errors. In yet another alternative embodiment, errors may be classified into low, medium and high severity levels.

An error flag may be set in response to an error in the inbound/outbound link that is reported to the error flow engine. A single inbound/outbound error may be classified as a transient or low severity error. The error flag may be cleared once the error flow is over and the link is free of errors. Additionally, a transient error counter may be used to keep track of the number of transient error flows, for example, by incrementing the counter whenever a transient error flow is completed.

An inbound/outbound persistent error flag may be set if the number of inbound/outbound transient errors within a first programmable interval of time is equal to a first programmable threshold value. This essentially gives the error rate, which is one of the key parameters to be kept under control for reliability reasons. The persistent error level is a medium severity error level for which the error flow engine may control the rectification process. An interval counter may be triggered by the first inbound/outbound transient error. If the number of errors is less than the programmable threshold value and the programmable interval of time is over, then the transient error counter is cleared. The first programmable threshold value and the first programmable interval of time may be set by the user. A persistent error counter is incremented when a persistent error flow is over. The persistent error counter keeps track of the number of persistent error flows.

A persistent error may also occur in other circumstances, for example, when an appropriate ECC (error correction code) engine raises a request for a persistent error flow. An inbound or an outbound link (or any other bit lanes internal to the memory controller or one of the memory modules) may have multiple bits and one of those bits may develop some fault or error, during which data intended for the failed bit lane can be transmitted through other healthy bit lanes; this mode of operation is referred to as bit lane fail-over mode. The ECC engine, for example, may raise a persistent error request when a component of the memory system is operating in a bit lane fail-over mode. However, there may be other situations when the ECC engine raises a request for a persistent error flow and the inventive principles of this patent disclosure is not limited to any specific situation.

An inbound/outbound uncontrollable error flag may be set when the number of times the inbound/outbound persistent error flow has been executed exceeds a second programmable threshold value. The term uncontrollable refers to the fact that the error rectification process for an uncontrollable error may not be controlled by the error flow engine alone and usually requires assistance from appropriate firmware. The second programmable threshold value may be set by the user.

In one exemplary embodiment, the interval of time during which the error has to exceed the second programmable threshold value in order to go to the uncontrollable error state may be set by the reaction time of firmware to a situation. For example, if firmware takes up the memory controller and link repair/clean up before the number of times persistent error flow has been executed exceeds the programmable threshold, the error becomes uncontrollable. In such an embodiment, the firmware may read and then clear all the error flow related state, in which case the user may not program the interval of time for the persistent to uncontrollable transition.

Additionally, there may be other error conditions that may trigger an uncontrollable error. For example, a control structure parity error, an FSM transition error, or a timeout while executing an error flow of less severity may also trigger an uncontrollable error state.

Error Flow (Error Rectification)

Figure 10:
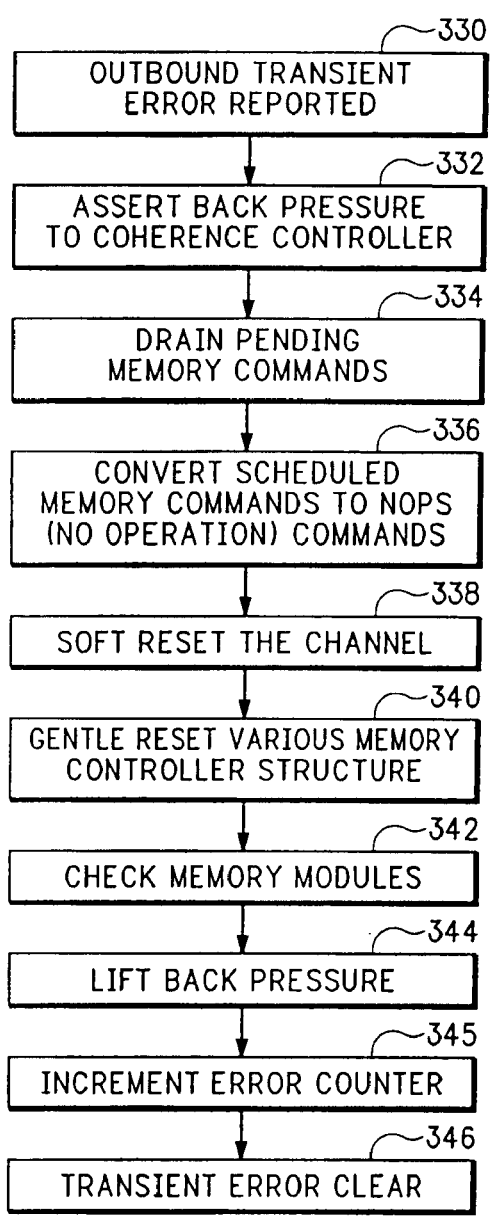
FIG. 10 illustrates an embodiment of an outbound transient error rectification process according to some of the inventive principles of this patent disclosure.

FIG. 10 illustrates an embodiment of an outbound transient error rectification process (outbound transient error flow) according to some of the inventive principles of this patent disclosure. As discussed before, an outbound error may be detected and reported to the error flow engine whenever an alert frame is present in the inbound path. Upon receiving an outbound transient error report (330), the memory controller asserts back pressure to the coherence controller (332). This prevents the coherence controller from further transmitting any memory access commands to the memory controller. At 334, the memory controller drains all pending memory commands and requests the coherence controller to retry them later. All the scheduled memory commands are then converted to NOPS (no operation) commands so that the commands are not executed (336). After all the commands have been drained, the error flow engine invokes a child FSM to go through a soft reset channel command frame injection sequence (338). During a soft reset, the controller may send a certain number of idle frames on the outbound link (to give time for the transient disturbances to die down), send a SOFT RESET command so that the residual state in the memory buffers 264 are reset, and then again send out a certain number of idle frames in the outbound link as a safety measure. The error flow engine then issues a gentle reset to various memory controller registers to clear any memory controller internal residue state (340). All the memory devices in the memory modules coupled to the memory controller are forced to come out of self refresh and are placed in a consistent, known state (342). This may be achieved by issuing a suitable command (for example, a PREALL command) to all the memory modules. At 344, the back pressure to the coherence controller is lifted, the NOPS commands are stopped, any alert frame detected flag is cleared, and the transient error counter is incremented (345), thus ending the outbound transient error flow (346).

An inbound transient error flow rectification process may be much simpler to handle as compared to an outbound transient error and may not require any special error flow. An inbound transient error may be rectified, for example, by retrying the erroneous transaction.

Figure 11:
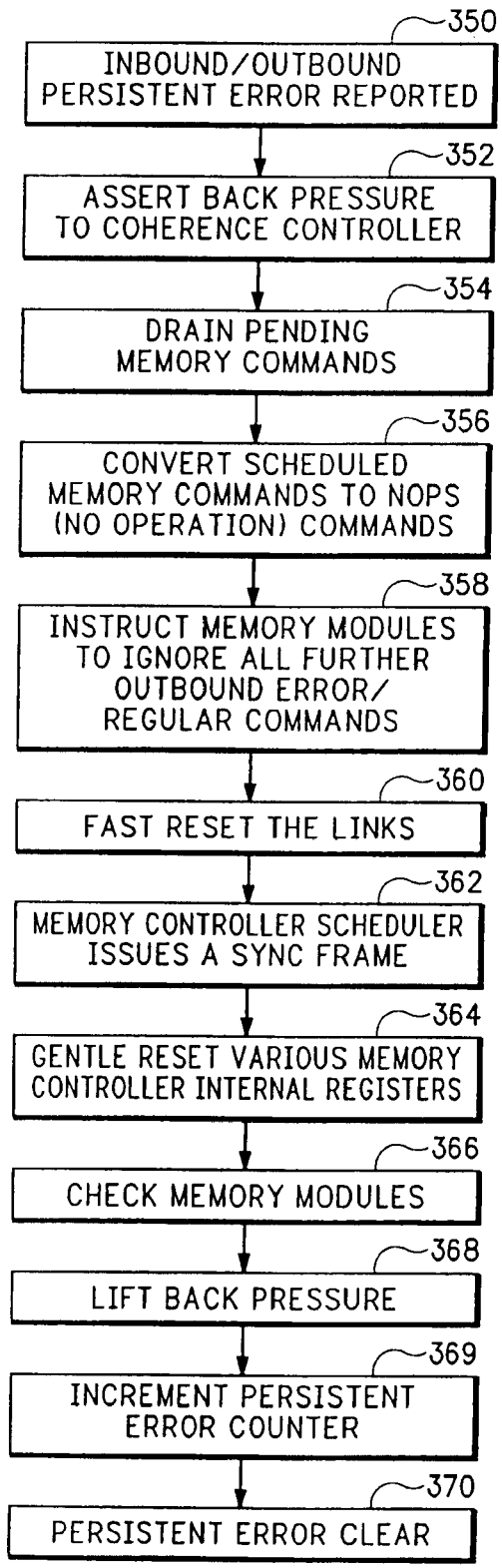
FIG. 11 illustrates an embodiment of an inbound/outbound persistent error flow according to some of the inventive principles of this patent disclosure.

FIG. 11 illustrates an exemplary embodiment of an inbound/outbound persistent error flow according to some of the inventive principles of this patent disclosure. Upon receiving an inbound/outbound persistent error report (350), the memory controller asserts back pressure to the coherence controller (352). This prevents the coherence controller from transmitting any further memory access commands to the memory controller. The memory controller drains all pending memory commands and requests the coherence controller to retry them later (354). All the scheduled memory commands are then converted to NOPS (no operation) commands so that the commands are not executed (356). The memory buffers 264 of the memory modules 252 (see, e.g., FIG. 7) are then instructed to ignore all further outbound error/regular commands (358). A fast reset of the inbound/outbound link is performed, where the link states are reset (360). After completion of the fast reset operation, a SYNC frame command (362) is issued by the memory controller scheduler which synchronizes all the memory modules. This SYNC command initializes the idle pattern generator in the memory buffers 264 and synchronizes it with the memory controller. The error flow engine then issues a gentle reset to various memory controller registers to clear any memory controller internal residue state (364). All the memory devices in the memory modules coupled to the memory controller are forced to come out of self refresh and are brought in a consistent, known state (366). This may be achieved by issuing a suitable command (for example, a PREALL command) to all the memory modules. At 368, the back pressure to the coherence controller is lifted, the NOPS commands are stopped, any alert frame detected flag is cleared, and the persistent error counter is incremented (369), thus ending the outbound transient error flow (370).

One potential problem with the fast reset sequence (360) is that the link might never get out of initialization because of catastrophic conditions like more than one link failing during initialization. So to make sure that the system progresses, a time out timer is started as soon as a persistent error flow starts and is reset if the flow completes successfully. If the flow is stuck due to a failure in the fast reset, then the timeout timer will expire eventually and it will make the error state uncontrollable.

The error flow may be further refined by introducing new error categories and/or new corrective actions, thereby reducing error flow time. For example, the fast reset (360) may take a longer time. In an alternate embodiment, the memory controller may perform a link retraining instead of a fast reset during persistent error flow (a link retraining is faster than a fast reset operation).

In yet another embodiment, the memory controller may have a new error severity level between the persistent and the uncontrollable error level, called the "severe" error level. The memory controller may perform a link retraining during a persistent error flow and perform a fast reset during a severe error flow. The transition from a persistent to a severe error flow may occur if errors within a certain interval of time exceed a programmable threshold limit during a persistent error flow.

As discussed above, an uncontrollable error state may be entered, for example, when the number of times the inbound/outbound persistent error flow has been executed exceeds a certain programmable threshold value. This essentially means the channel is unusable ('link dead') and firmware controlled corrective action may be taken. During a link dead condition, a link dead signal is asserted to the coherence controller. This prevents the coherence controller from transmitting any further memory access commands to the memory controller. All the scheduled memory commands are then converted to NOPS (no operation) commands to render them ineffective on the link. All further link errors may be ignored from this point on, and control of the error rectification process is passed on to appropriate firmware.

Additionally, other types of errors may also be classified as uncontrollable errors. For example, a control structure parity error, an FSM transition error or a timeout while executing an error flow of less severity may also trigger an uncontrollable error state. This would essentially mean that the memory controlled is unusable ('memory controller dead'). At this stage, the coherence controller is notified of memory controller dead situation. The coherence controller, from this point, ignores all read data coming from the memory controller and the error rectification process is passed on to an appropriate firmware.

Figure 12:
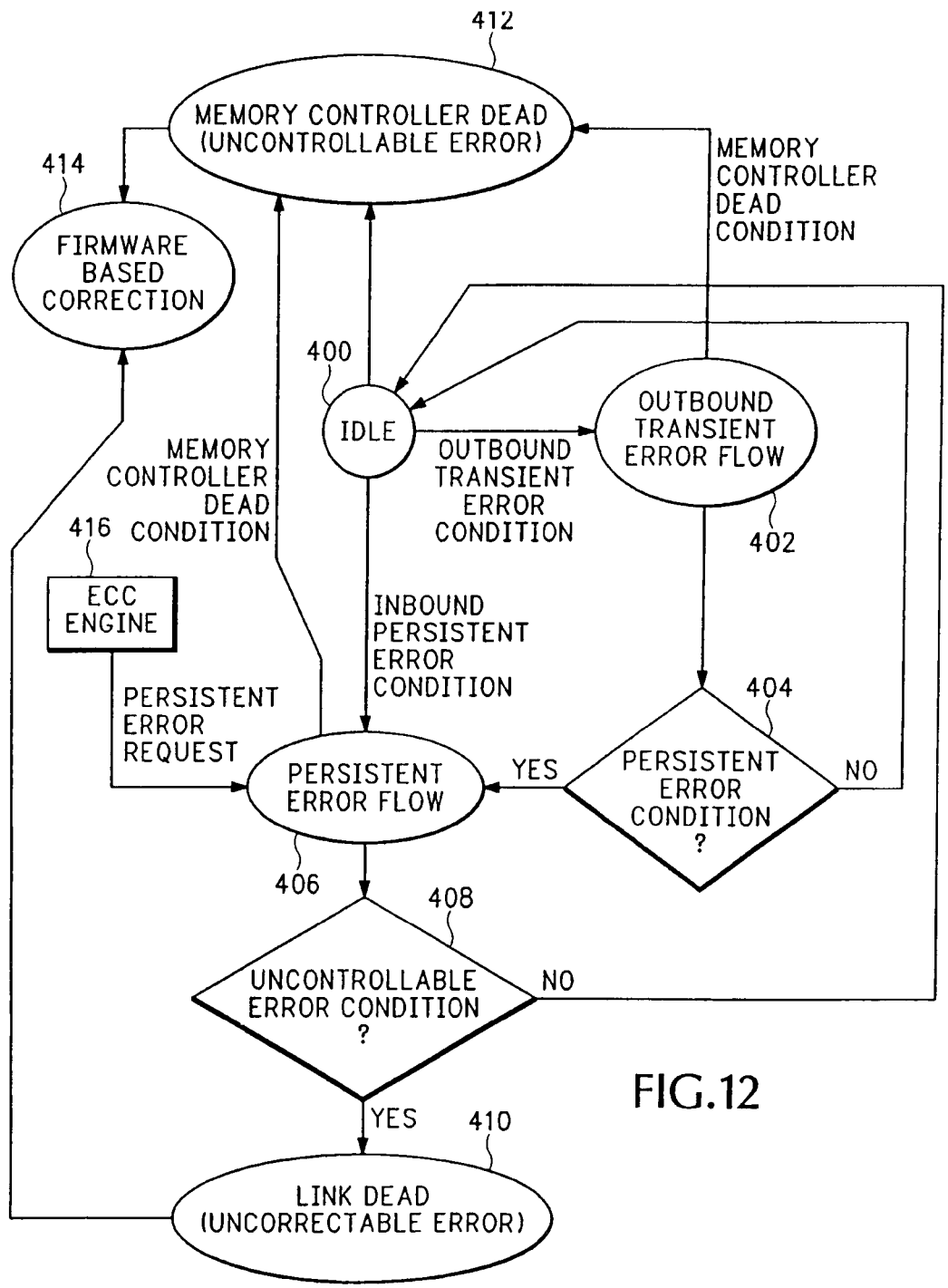
FIG. 12 illustrates another embodiment of the overall error flow algorithm according to some of the inventive principles of this patent disclosure.

FIG. 12 illustrates an embodiment of an overall error flow algorithm according to some of the inventive principles of this patent disclosure. The error flow engine is initially in the idle state (400), which is the default state, while the memory system is operating normally. In this state, any errors in the links are detected and reported to the error flow engine. A single error or an error rate increase can force the engine to transition from this state to one of the error flow states. With an occurrence of an outbound error, the error flow engine enters the outbound transient error flow (402).

Upon successful completion of the outbound transient error flow, the error flow engine decides whether the persistent error condition has been met (404). If no further errors occur, the error flow engine returns to the idle state. However, if there is further occurrence of an outbound transient error, and the persistent error condition is met, then the error flow engine enters the persistent error flow (406). This state can also be entered directly from the idle state (400) if the inbound persistent error condition is met. As discussed above, there may be no special error flow for an inbound transient error condition and hence, the error flow engine may directly enter a persistent error flow from the idle state in the event of inbound errors. A persistent error may also occur in other circumstances, for example, when an appropriate ECC engine raises a request for a persistent error flow (416).

Upon successful completion of the persistent error flow, the error flow engine decides whether the uncontrollable error a condition has been met (408). If no further error occurs, then the uncontrollable error condition would not be met and the error flow engine returns to the idle state. However, if there is further occurrence of a persistent error, and the uncontrollable error condition is met, then the error flow engine enters the link dead uncontrollable error flow (410). In a link dead uncontrollable error condition, firmware may be involved (414) in the error rectification process.

A memory controller dead condition (412), which is also an uncontrollable error state, may be directly entered from the idle state. This may happen, for example, during a control structure parity error or an FSM transition error. Again, firmware may be involved (414) in the error correction process. A memory controller dead condition may also be entered from a transient or a persistent error flow, for example, during a timeout while executing a transient or a persistent error flow.

Figure 13:
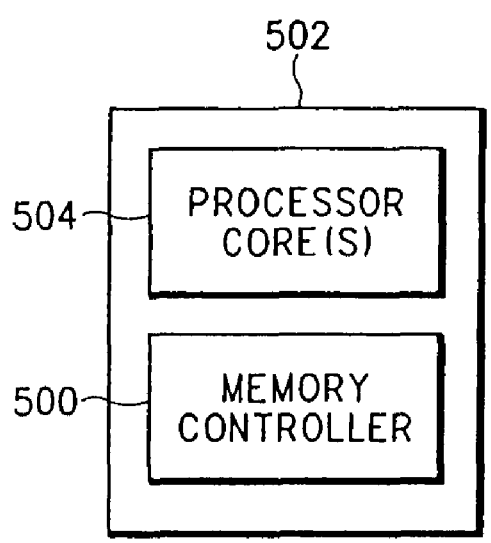
FIG. 13 illustrates an embodiment of a system having a memory controller according to some of the inventive principles of this patent disclosure.
Figure 14:
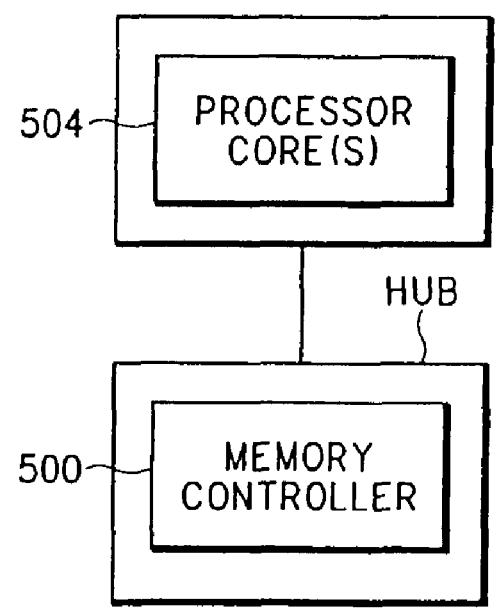
FIG. 14 illustrates another embodiment of a system having a memory controller according to some of the inventive principles of this patent disclosure.

The embodiments described herein may be modified in arrangement and detail without departing from the inventive principles. For example, embodiments have been described having specific error classification, support logic etc., but the inventive principles are not limited to these details. Support logic has been described to perform specific tasks, for example, monitoring link errors; however, these tasks can directly be performed by the error flow engine. In yet another example, a persistent error may be further classified into several subcategories, each with different error flow. As a further example, a memory controller 500 according to the inventive principles may be implemented as a separate component, as part of an integrated circuit 502 having one or more processors 504 (as shown in FIG. 13), as part of a memory controller hub 506, which may in turn be part of a chipset that is separate from one or more processors 504 (as shown in FIG. 14), etc.. Accordingly, such variations are considered to fall within the scope of the following claims.

The invention claimed is:

1. A memory agent comprising:
a first interface to transmit data to a second memory agent over a first link;
a second interface to receive data from the second memory agent over a second link; and
error hardware to monitor errors in the links;
where the error hardware includes logic to classify the errors into different severity levels;
where the error hardware includes logic to control error corrective action based on the severity level of errors; and
where the error hardware includes logic to monitor the error rate.

2. A memory agent comprising:
a first interface to transmit data to a second memory agent over a first link;
a second interface to receive data from the second memory agent over a second link; and
error hardware to monitor errors in the links;
where the error hardware includes logic to classify the errors into different severity levels;
where the error hardware includes logic to control error corrective action based on the severity level of errors; and
where the error hardware includes logic to perform a gentle reset in response to a transient error.

3. A memory agent comprising:
a first interface to transmit data to a second memory agent over a first link;
a second interface to receive data from the second memory agent over a second link; and
error hardware to monitor errors in the links;
where the error hardware includes logic to classify the errors into different severity levels;
where the error hardware includes logic to control error corrective action based on the severity level of errors; and
where the error hardware includes logic to perform a fast reset in response to a persistent and/or severe error.

4. A memory agent comprising:
a first interface to transmit data to a second memory agent over a first link;

a second interface to receive data from the second memory agent over a second link; and error hardware to monitor errors in the links;

where the error hardware includes logic to classify the errors into different severity levels;

where the error hardware includes logic to control error corrective action based on the severity level of errors; and where the error hardware includes logic to request firmware control of error corrective action in response to a high severity error.

5. A memory agent comprising:

a first interface to transmit data to a second memory agent over a first link;

a second interface to receive data from the second memory agent over a second link; and error hardware to monitor errors in the links;

where the error hardware includes logic to classify the errors into different severity levels;

where the error hardware includes logic to control error corrective action based on the severity level of errors; and where the error hardware includes logic to request firmware control of error corrective action in response to a hardware uncontrollable error.

6. A system comprising:

a first memory agent;

a second memory agent;

a first link coupled between the first memory agent to the second memory agent; and a second link coupled between the first memory agent to the second memory agent;

where the first memory agent includes error hardware to monitor errors in the links;

where the error hardware includes logic to classify the errors into different severity levels;

where the error hardware includes logic to control error corrective action based on the severity level of errors; and where the first memory agent is part of a chipset.

7. A memory agent comprising:

a first interface to transmit data to a second memory agent over a first link;

a second interface to receive data from the second memory agent over a second link; and error hardware to classify errors in the links into different severity levels;

where the error hardware includes logic to request firmware control of error corrective action in response to the severity level of an error.

8. A memory agent comprising:

a first interface to transmit data to a second memory agent over a first link;

a second interface to receive data from the second memory agent over a second link; and error hardware to classify errors in the links into different severity levels;

where the error hardware includes logic to request firmware control of error corrective action in response to a hardware uncontrollable error.

9. A memory agent comprising:

a first interface to transmit data to a second memory agent over a first link;

a second interface to receive data from the second memory agent over a second link; and error hardware to control corrective action for errors in the links;

where the error hardware includes logic to classify the errors into different severity levels; and where the error hardware includes logic to provide hardware control of corrective action for an error of a first severity level and request firmware control of error corrective action for an error of a second severity level.

* * * * *